Patented Apr. 4, 1944

2,345,655

UNITED STATES PATENT OFFICE 2,345,655

PROCESS FOR PRODUCING MAGNESIUM SULPHATE FROM MAGNESIUM-BEARING ROCKS

Hellmuth R. Brandenburg, Cowell, Calif., assignor to Idaho Maryland Mines Corporation, San Francisco, Calif., a corporation of Nevada No Drawing. Application March 23, 1940, Serial No. 325,642

5 Claims. (Cl. 23—128)

The present invention relates to improvements in a process for recovering water soluble salt of magnesium from hydrous magnesium silicates and other magnesian rocks, and it consists in the steps of the process hereinafter described and claimed.

The object of the present invention is a process of recovery of a water soluble salt of magnesium from inherently unstable and basic, or potentially basic, magnesian rocks and minerals. A dry process of conversion is used which produces directly a salt of a high degree of purity, higher than that produced directly by the acid processes now used in the industry.

The process deals with hydrous magnesium silicates, such as serpentine, and is adaptable to hydroxide of magnesium, such as brucite; to carbonate of magnesium, such as magnesite; to calcium-magnesium carbonate, such as dolomite; and to low grade, highly siliceous magnesites that cannot now be properly handled by any known process. The serpentine group according to Dana and other authorities includes: precious or noble serpentine; serpentine in rock masses; ophiolite; bastite; antigorite; retinalite; bowenite; marmolite; picrolite; deywelite; genthite; and garnierite. It is possible to use any one of these in the process.

The step of calcination in the present process produces from the mineral, closely comingled, but in easily separable form, a salt of magnesium which is inherently water soluble, and impurities with which the mineral was originally endowed; these impurities not being water soluble or negligibly so.

The present process deals specifically with the preparation of the sulphate of magnesium. Other objects will appear in the following specification and the novel steps will be set forth in the appended claims. The process will effect the formation of a water soluble salt of magnesium coincident with the step of calcination.

The steps in the process are as follows: The mineral is first broken up into small pieces and is then calcined with a starting temperature of about 600° F., and the maximum temperature is not required to exceed 1200° F. During the calcining operation, an atmosphere charged with an acid radical of the heavy mineral acids, or acid vapor, is passed over the material undergoing calcination; the acid radical in question being sulphur dioxide or sulphur trioxide. The calcination and the degree of fixation of the acid radical is so controlled as to leave the calcine slightly alkaline.

The fact that the degree of fixation of the acid vapors is so regulated as to produce a final calcine showing a distinct alkaline reaction, rather than an acid reaction, inhibits an undesired attack on the part of the acid vapors upon the ferrugineous mineral constituents always found to be associated with magnesian rocks and minerals and particularly serpentine, and by virtue thereof prevents their eventual introduction as a water soluble salt into the megnesian saline. The calcination temperature employed also automatically prevents pertinent amounts of silicate matter, or silica, from entering into and contaminating the saline which is produced when the calcine is discharged into water wherein water soluble salts will dissolve.

The process not only permits raw material of an extremely low value to be commercially handled, but the process can handle dolomites and eliminate the lime which is a costly procedure to accomplish under conventional processes.

When dolomite is used, the lime will be largely, if not entirely, converted into calcium sulphate, which can be readily removed due to its low solubility from the magnesium sulphate that has been formed; the relative solubility in water being (1) for calcium sulphate and (1500) for magnesium sulphate. In nearly saturated magnesium sulphate solutions, the solubility of calcium sulphate is virtually nil.

Having described the generalities upon which the process rests I will now describe the same in greater detail and will cite a working example for the processing of a hydrous magnesium silicate, such as serpentine; bearing in mind that other magnesian minerals can be treated in like and essentially similar manner by anyone skilled in the arts.

For the production of magnesium sulphate I prefer to use, on account of costs, pyrites of iron for the acid radical supplying substance; or any other material containing sulphur in a form suitable for this purpose, for example copperas, an iron sulphate.

In the case of serpentine and pyrites of iron, I blend together, preferably in a finely ground condition, from sixty-five to seventy-five parts of serpentine and from twenty-five to thirty-five parts of pyrites of iron. Mention has been made of the somewhat variable character of serpentine minerals and for this reason hard and fast proportions cannot be given, the above being about the average. It should also be stated here that of the magnesium silicate minerals, only the inherently unstable and chemically unbalanced types, such as belong to the serpentine group and the like are amenable to this process; while the stable magnesium silicate minerals, such as we find in the talc group, will not respond to my process.

The blend, or mixture of serpentine and pyrite, is then fed to a suitable type of calcining furnace, such as the Wedge furnace or the like. It is desirable to start the calcining operation at the rather low temperature of from 600° F. to 650° F., and to use means for but slowly increasing the temperature. When the calcine attains a temperature of 700° F., or thereabouts, the pyrite reaches kindling temperature and burns to produce oxides of sulphur (sulphur dioxide and sulphur trioxide), these gases reacting with magnesium oxide to form sulphite and sulphate of magnesium. It then becomes necessary to raise the temperature in but small increments to prevent the escape, or wastage, of sulphur dioxide gas. Thus the presence, or absence, of free sulphur dioxide gas acts as a suitable indicator for regulating both the speed of calcination and the rate for elevating the temperature in the temperature range between 700° F. and 900° F. By this time the pyrite will have been consumed and the temperature may be raised in larger increments with a simultaneous speeding up of the calcining operation. When a temperature of 1000° F., but which need not exceed 1200° F., has been reached we have the assurance that all sulphites which may have been formed have now been fully oxidized to sulphates, and that the calcine is ready for discharge from the furnace. Care should be taken that the finishing temperature does not exceed or even approach that of the melting point or dissociation point of the salt formed. In certain cases a calcining temperature of 1600° F. may give much better results, so long as the dissociation point of the salt is not reached. The calcine may be directly discharged into a sufficiency of water whereby through the temperature rise the magnesium salt becomes almost immediately water soluble.

The solution of salt may then be separated from the waste products by any suitable and conventional means, such as by lixiviation and filtration, and thereafter the salt bearing solution may be evaporated or set aside to crystallize spontaneously. The final product will be magnesium sulphate, which when containing seven molecules of water of crystallization is commonly known as Epsom salts.

The magnesium salt, sulphate, may then directly enter industry for use as such or may serve as the starting point for conversion into other compounds of magnesium. The magnesium sulphate produced under my process has yielded directly and without need of further refining a salt in purity as high as 99.7%.

It is, of course, desirable from an economic standpoint that the process be carried out as a continuous type of process with all the benefits attending such a continuous operation. The continuity of the reactions herein involved may then be written as follows for serpentine:

(1) Serpentine $(3MgO.2SiO_2.2H_2O)$ + heat = normal magnesium silicate $(2(MgO.SiO_2))$ + magnesium oxide $(MgO)$ + water $(H_2O)$.

(2) Magnesium oxide $(MgO)$ + sulphur dioxide $(SO_2)$ = magnesium sulphite $(MgSO_3)$.

(3) Magnesium sulphite $(MgSO_3)$ + oxygen $(O)$ (from the atmosphere) = magnesium sulphate $(MgSO_4)$.

(4) Combining reactions (2) and (3) for the sake of simplicity or when otherwise indicated, we may write:

Magnesium oxide $(MgO)$ + sulphur trioxide $(SO_3)$ = magnesium sulphate $(MgSO_4)$.

The combining weights of magnesium oxide and sulphur trioxide being 40.3 and 80, respectively, we can, knowing the available magnesia oxide content of our raw material and the sulphur trioxide content obtainable from our sulphur supplying material, calculate the exact amounts of each required. Therefore, by properly adjusting the quantity relationship, and the operating condition, between the acid radical and the base so that a sufficiency of unsatisfied magnesia oxide remains available, we attain a protective alkalinity for rendering into insoluble form any compound other than the predominant magnesium sulphate, such as for example water soluble alkali sulphates therein producing by this process in one step a high purity salt of magnesium. Under proper operation the amount of magnesium oxide reserved for purposes of "protective alkalinity" need not exceed 0.25% magnesium oxide in available and reactive form, in the final calcined product.

When the calcining temperature and operating conditions prescribed are reasonably closely adhered to, attack on the pertinent amounts of ferruginous constituents present in this material will be negligible therein requiring a minimum of protective alkalinity and insuring an overall high efficiency for the process.

I claim:

1. A process for making magnesium sulphate which comprises calcining a magnesia-bearing mineral in an atmosphere containing oxides of sulphur, thereby converting magnesia in the mineral to magnesium sulphate, limiting the amount of oxides of sulphur supplied in the heating to an amount which leaves a portion of free magnesia in the calcined product, and dissolving magnesium sulphate from the calcined product with water.

2. A process for making magnesium sulphate which comprises calcining a magnesia-bearing mineral in an atmosphere containing oxides of sulphur, thereby converting magnesia in the mineral to magnesium sulphate, limiting the amount of oxides of sulphur supplied in the heating to an amount which leaves a portion of free magnesia in the calcined product, dissolving magnesium sulphate from the calcined product with water, separating the magnesium sulphate solution from the insoluble materials, and then recovering the magnesium sulphate from the solution.

3. The process of making magnesium sulphate from serpentine rock which comprises mixing 65 to 75 parts of serpentine with 25 to 35 parts of iron pyrites, calcining the mixture with gradually increasing temperature between the limits of about 600° F. and 1200° F. in an atmosphere containing oxides of sulphur, thereby converting magnesia in the mineral to magnesium sulphate, but leaving a portion of free magnesia in the calcined product, and then separating the magnesium sulphate from the calcined product by lixiviation and filtering.

4. The process of making magnesium sulphate from serpentine rock and iron pyrites, which comprises blending the rock and the pyrites in proportions to form magnesium sulphate with an excess of magnesia, calcining the mixture to convert a substantial portion of the magnesia into magnesium sulphate but leaving a portion of free magnesia in the calcined product, dissolving the magnesium sulphate in water, separating the magnesium sulphate solution from the undissolved residue, and recovering the magnesium sulphate from the solution.

5. A process of making magnesium sulphate from serpentine rock which comprises, calcining the rock in an atmosphere containing oxides of sulphur, thereby converting magnesia in the mineral to magnesium sulphate, limiting the amount of oxides of sulphur supplied in the heating to an amount which leaves a portion of free magnesia in the calcined product, and then recovering the magnesium sulphate by lixiviation and filtration.

HELLMUTH R. BRANDENBURG.